(12) United States Patent
Mischo

(10) Patent No.: US 6,295,603 B1
(45) Date of Patent: Sep. 25, 2001

(54) PROGRAM CONTROLLED UNIT INCLUDING A SEGMENT POINTER SELECTING A BOOTSTRAP LOADER TO BE BOOTED FROM A PLURALITY OF STORED BOOTSTRAP LOADERS

(75) Inventor: Walter Mischo, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/195,487

(22) Filed: Nov. 18, 1998

(30) Foreign Application Priority Data

Nov. 18, 1997 (DE) ................................ 197 51 093

(51) Int. Cl.$^7$ .................................................. G06F 9/24
(52) U.S. Cl. ............................................................ 713/2
(58) Field of Search ........................... 713/1, 2, 100

(56) References Cited

U.S. PATENT DOCUMENTS

| | | |
|---|---|---|
| 4,943,911 | 7/1990 | Kopp et al. . |
| 5,355,489 * | 10/1994 | Bealkowski et al. ............. 713/2 |
| 5,355,498 | 10/1994 | Provino et al. . |
| 5,452,454 * | 9/1995 | Basu ................................ 713/2 |
| 5,465,357 * | 11/1995 | Bealkowski et al. ............. 713/2 |
| 5,471,674 | 11/1995 | Stewart et al. . |
| 5,564,030 | 10/1996 | Whitted, III et al. . |
| 5,579,522 * | 11/1996 | Christeson et al. .............. 713/2 |

OTHER PUBLICATIONS

"Rund um die Technik von PC, Peripherie und Rechnerkommunikation", Arbeitsbuch PC Hardware, Gebhard Joachim Oerter et al., Franzis–Verlag, München, pp. 23–24.
John Ioannidis et al.: "Porting AIX onto the Student Electronic Notebook", Sigsmall/PC Notes, vol. 17 (1991) Fall/Winter, No. ¾, New York, US.

* cited by examiner

Primary Examiner—Dennis M. Butler
(74) Attorney, Agent, or Firm—Herbert L. Lerner; Laurence A. Greenberg; Werner H. Stemer

(57) ABSTRACT

The program-controlled unit selects individual segments for use from the available memory by using a segment pointer. The content of the segment pointer can be changed before and/or after the execution of a bootstrap loading operation. The outlay to be implemented for handling the bootstrap loader can

16 Claims, 3 Drawing Sheets

PROGRAM CONTROLLED UNIT INCLUDING A SEGMENT POINTER SELECTING A BOOTSTRAP LOADER TO BE BOOTED FROM A PLURALITY OF STORED BOOTSTRAP LOADERS

BACKGROUND OF THE INVENTION:

Field of the Invention:

The invention lies in the field of electronics and relates, in particular, to a program-controlled unit which is enabled to select individual segments for use from an available memory by using a segment pointer.

Program-controlled units of this type are, for example, microprocessors, microcontrollers, or signal processors. As a rule, they are designed to execute programs straight away from the beginning (from the time when they are switched on or reset). The programs to be executed, more precisely the program codes representing the programs, may thereby be stored in program memories provided in the program-controlled unit or be read into the program-controlled unit externally via an interface to an external memory or a serial interface.

The fundamental structure of a program-controlled unit in which all of the above-mentioned possibilities are optionally available is illustrated in FIG. 3. A program-controlled unit 1 shown there comprises a central processing unit (CPU) 11, a first read-only memory in the form of a first ROM 12, a second read-only memory in the form of a second ROM 13, an internal random-access memory in the form of an internal RAM 14, a (memory) interface 15 for connecting the program-controlled unit 1 to a non-illustrated external memory and a serial interface 16.

The program which is intended to be executed when the program-controlled unit 1 is started up or is reset may be stored in the first ROM 12, in the second ROM 13, or in the external memory.

Whether the startup program that is executed when the program-controlled unit is started up or on reset is a program stored in the first ROM 12, a program stored in the second ROM 13 or a program stored in the external memory, depends on the addresses under which the respective memories can be addressed at the relevant point in time. The program to be executed after the program-controlled unit has been started up or reset is read out by the program-controlled unit in standard fashion, starting from a quite specific address. In the exemplary embodiment, the address is equal to zero. If it is the first ROM 12 which can be addressed via the address 0, then the program which is stored in the first ROM 12 starting from the location which can be addressed by the address 0 is executed. If it is the second ROM 13 which can be addressed via the address 0, then the program stored in the second ROM 13 starting from the location which can be addressed by the address 0 is executed. If it is the external memory that can be addressed via the address 0, then the program stored in the external memory starting from the location that can be addressed by the address 0 is executed.

Programs stored within the program-controlled unit are, for example, the so-called bootstrap loaders. A bootstrap loader is a program which enables the following to be instigated: data representing programs are read in via the serial interface 16 of the program-controlled unit 1, are stored in the internal RAM 14 and, finally, are read from the latter and executed.

The bootstrap loader is stored in the second ROM 13 in the exemplary embodiment. In order that the bootstrap loader is executed after the program-controlled unit has been started up or reset, it is necessary to ensure that the second ROM 13, more precisely the location starting from which the bootstrap loader is stored therein, can be addressed via the address 0. This is done by mapping the second ROM 13, at least during the execution of the bootstrap loader, onto that location of the memory area (which can be addressed by the program-controlled unit) at which the read-out of the program code is begun after the program-controlled unit has been switched on or reset.

As a result of the mapping, the relevant memory is temporarily allocated specific addresses; consequently, specific memory regions can selectively be inserted into the memory space (which is addressable by the program-controlled unit) or be blanked out therefrom.

If a program stored in the first ROM 12 or in the external memory is intended to be executed, rather than the bootstrap loader, after the program-controlled unit has been started up or reset, then the first ROM 12 or the external memory must be made addressable via the address 0 by means of mapping.

Mapping is associated with a quite considerable outlay in terms of management and organizational resources.

SUMMARY OF THE INVENTION

It is accordingly an object of the invention to provide a program-controlled unit, which overcomes the above-mentioned disadvantages of the heretofore-known devices and methods of this general type and which minimizes the outlay for the execution of the bootstrap loader.

With the foregoing and other objects in view there is provided, in accordance with the invention, a program-controlled unit of the type selecting individual memory segments from a memory whereby a segment pointer identifies the memory segment to be accessed, wherein the improvement comprises:

a segment pointer having a content that can be changed prior to an execution by the program-controlled unit of a program to be executed during a boot-up of the program-controlled unit.

With the above and other objects in view there is also provided, in accordance with the invention, a method of operating a program-controlled unit, which comprises:

selecting individual memory segments from an available memory by setting a segment pointer; and selectively setting a content of the segment pointer prior to executing a bootstrap loading operation with the program-controlled unit.

As a result, the program to be executed after the starting up or resetting of the program-controlled unit no longer has to be stored at a quite specific location. It must—if at all—be stored, should the need arise, at a specific location within any desired memory segment. Since the memory can be subdivided into a multiplicity of memory segments, a multiplicity of programs to be executed after the starting up or resetting of the program-controlled unit can be stored in the memory. It is thus possible—unlike the prior art situation—that each of these programs can be read out and executed without the respective memory segments being mapped onto a specific location.

The relatively complicated mapping in the context of memory segmentation has consequently been replaced by individual setting of the memory segment to be addressed.

The outlay for execution of the bootstrap loader can thereby be reduced to a minimum.

In accordance with an added feature of the invention, the memory segments are at least partially formed by an internal memory of the program-controlled unit.

In accordance with another feature of the invention, the internal memory of the program-controlled unit defines memory segments having an ordinal number 2 and/or greater.

In accordance with an additional feature of the invention, the internal memory of the program-controlled unit is a flash EPROM. In other words, the invention facilitates the replacement of the internal ROMs of the program-controlled unit by so-called flash EPROMs.

The use of flash EPROMs instead of the normal ROMs has been risky heretofore because there was the danger that the bootstrap loader might be inadvertently erased and/or overwritten by a nonexecutable program or one not running as desired: at the address at which the bootstrap loader has had to be located heretofore in order to be executed after the starting up or resetting of the program-controlled unit, sometimes certain other items of information, data or programs, such as interrupt vector tables, for example, must also be present during "normal" operation of the program-controlled unit. If the bootstrap loader is overwritten by these items of information, the program-controlled unit can no longer be started or rebooted with the execution of the bootstrap loader or at any rate can only be started after complicated procedures. Such inadvertence can now be precluded with high probability because the bootstrap loader in the case of the program-controlled unit according to the invention precisely no longer has to be stored where other items of information, data or programs must be stored during normal operation of the program-controlled unit.

In accordance with again an added feature of the invention, a bootstrap loader to be executed during the boot-up of the program-controlled unit is stored in the internal memory. Preferably, the bootstrap loader is stored in a second (or higher) memory segment of the internal memory.

In accordance with again another feature of the invention, the program-controlled unit is programmed to change a content of the segment pointer on boot-up such that a changed segment pointer selects the memory segment in which the bootstrap loader is stored. It is thereby preferred for the segment pointer of the memory segment in which the bootstrap loader is stored to differ from the segment pointer of the memory segment that is selected by standard on first boot-up of the program-controlled unit in as few bits as possible.

In accordance with again a further feature of the invention, the program-controlled unit changes the content of the segment pointer in response to input from a source external to the program-controlled unit. In other words, the specific segment address can be selected by the user or other source on boot-up.

In accordance with a concomitant feature of the invention, the program-controlled unit is a microprocessor, a microcontroller, or a signal processor.

Other features which are considered as characteristic for the invention are set forth in the appended claims.

Although the invention is illustrated and described herein as embodied in a program-controlled unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
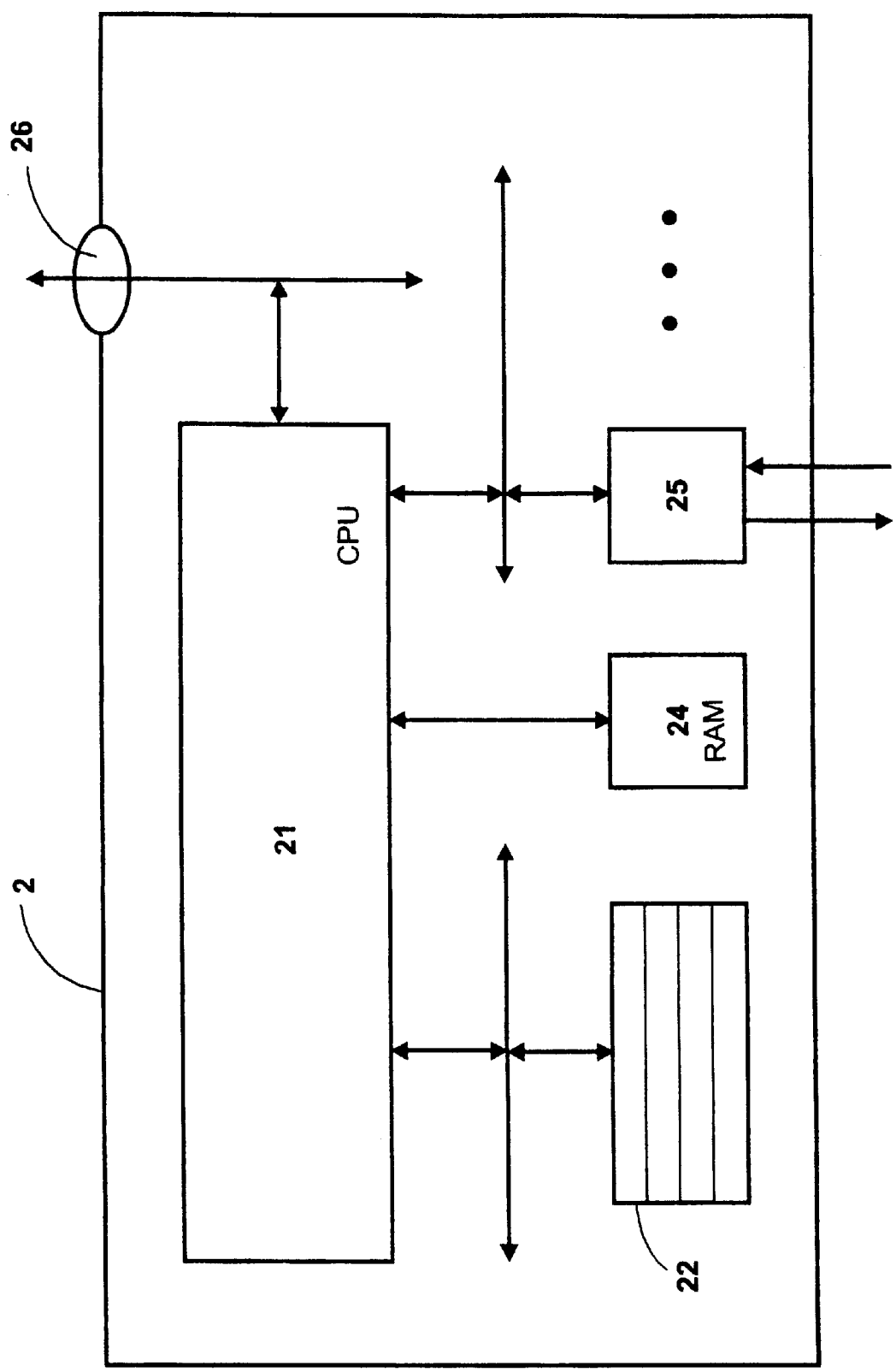
FIG. 1 is a block diagram showing the internal structure of a program-controlled unit according to the invention.

Referring now to the figures of the drawing in detail and first, particularly, to FIG. 1 thereof, there is seen a microcontroller 2 that represents the program-controlled unit of the invention. It will be appreciated that the invention is not restricted to microcontrollers. The program-controlled unit may also be a microprocessor, a signal processor or the like.

The terms "boot-up" and "booting" in the text are used as synonyms for fetching (and executing) the bootstrap loader after the switching on or resetting of the program-controlled unit. A boot-up thus occurs when the unit is first turned on or when it is reset.

The microcontroller 2 contains, inter alia, a central processing unit (CPU) 21, a read-only memory in the form of a flash EPROM 22, an internal random-access memory in the form of an internal RAM 24, a (memory) interface 25 for connecting the program-controlled unit 2 to a non-illustrated external memory, and a serial interface 6.

The flash EPROM 22 of the exemplary embodiment has a capacity of 128 KB and is subdivided into two or more areas that can be erased and/or overwritten independently of one another. As indicated in FIG. 1, in the exemplary embodiment the flash EPROM consists of four regions each comprising 32 KB (each can be erased and/or overwritten independently of the other).

Figure 2:
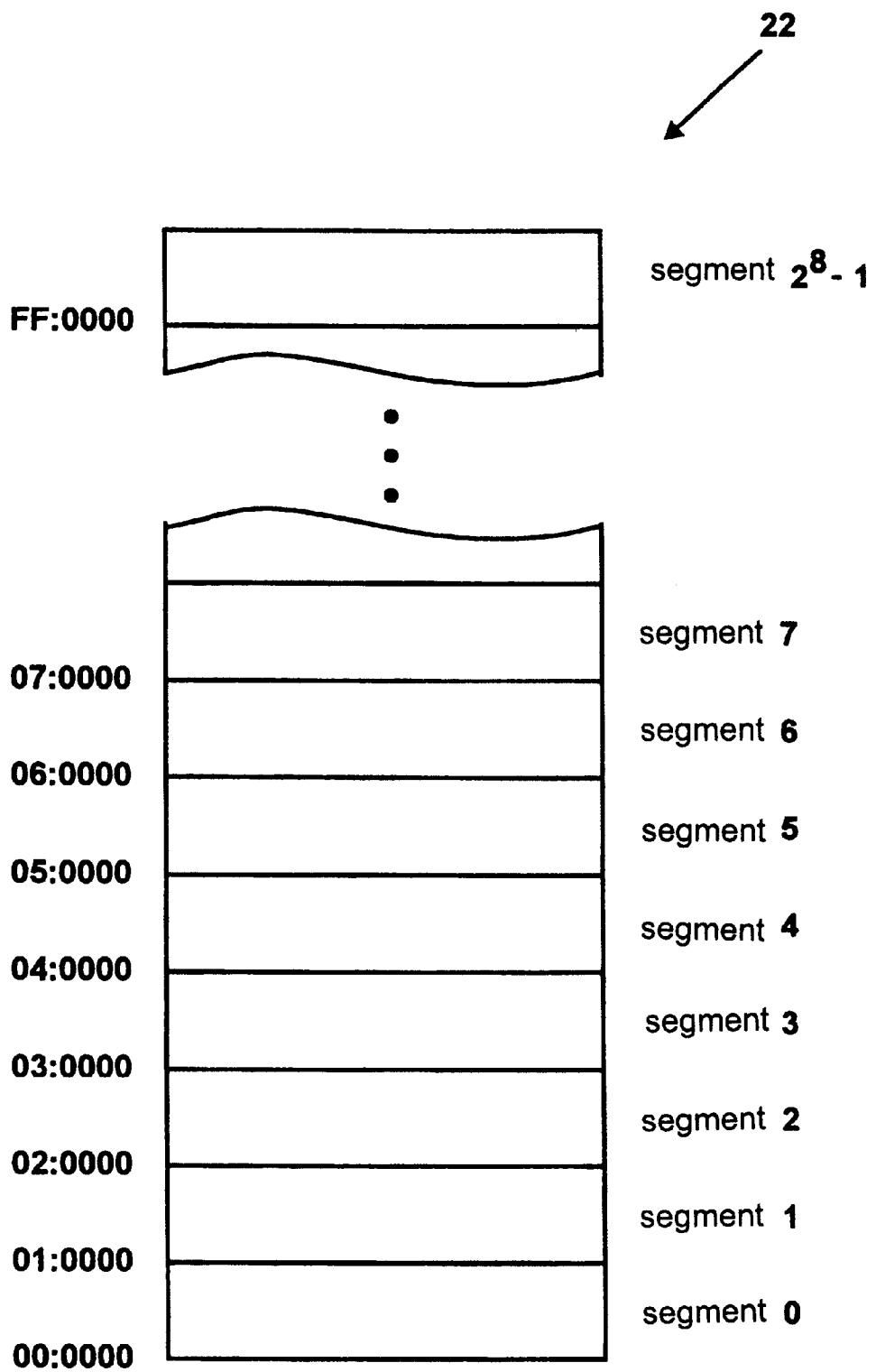
FIG. 2 is a diagrammatic address structure of the memory which can be addressed by the program-controlled unit.
Figure 3:
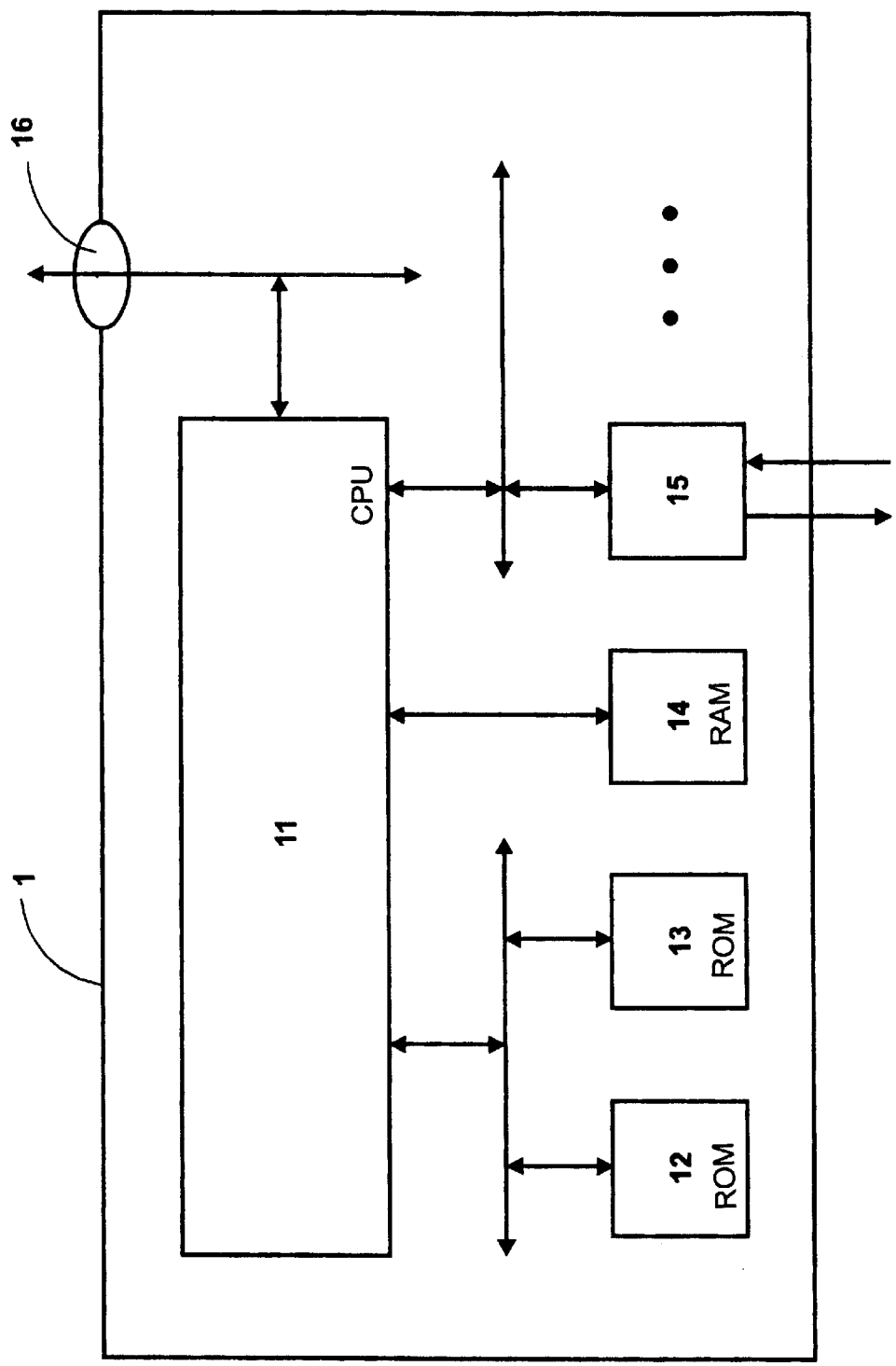
FIG. 3 is a block diagram showing the internal structure of a conventional program-controlled unit.

The flash EPROM 22 and the external memory afford an overall memory which, during use by the program-controlled unit 2, is structured as illustrated in FIG. 2.

Referring now more specifically to FIG. 2, during use by the program-controlled unit 2 the memory under consideration is subdivided into up to 28 segments, each memory segment being designed for the storage of 65536 (=64K) words (bytes in the example).

The addresses via which the memory can be addressed are composed of a segment pointer SZ, having a width of 8 bits, and an intrasegment address ISA, having a width of 16 bits, and are written SZ:ISA in the present case. The intrasegment address represents—as already indicated by the designation—the address within a respective memory segment; the segment pointer specifies the memory segment to which the intrasegment address refers.

Of the $2^8$ memory segments, for example, the first two memory segments, that is to say the memory segments having the ordinal numbers 0 and 1, may be formed by the internal flash EPROM 22, and the remaining memory segments, that is to say the memory segments having the ordinal numbers 2 to $2^8-1$, may be formed by the external memory.

The program-controlled unit 2, more precisely the CPU 21 thereof, is designed to execute programs from the beginning, that is to say immediately after the starting up or resetting of the program-controlled unit.

The program which is intended to be executed when the program-controlled unit has been started up or reset is stored either in the flash EPROM 22 or in the external memory.

The program that is executed when the program-controlled unit has been started up or after the program-controlled unit has been reset is a program stored in the flash EPROM 22 or a program stored in the external memory, depending on the value of the segment pointer. Unlike the situation heretofore, the memory area containing the program to be executed is not mapped onto a specific location. Rather, the segment pointer is set in such a way that the memory segment in which the program to be executed is stored is thereby selected.

Preferably, the programs appropriate for execution after the starting up or resetting of the program-controlled unit are stored in the respective segments starting from the same intrasegment address. They are located "only" in different memory segments, in other words have "only" different segment pointers in their addresses. The different segment pointers in this case preferably differ as little as possible from one another (only in terms of one bit in the best instance). It is then possible to define which program is to be executed after the starting up or resetting of the program-controlled unit solely by changing one or a few bits of the segment pointer.

The program-controlled unit of the exemplary embodiment is designed in such a way that the segment pointer and the intrasegment address have the value 0 as standard after the starting up or resetting of the program-controlled unit, and that the segment pointer can be set to a different value (for example 2) in response to external instigation after the starting up or resetting of the program-controlled unit.

In the exemplary embodiment, the external instigation consists in the application of a specific signal to one or more pins of the program-controlled unit in the course of the program-controlled unit being switched on and reset. This circumstance can be unequivocally identified by an evaluation logic arrangement and can be used as grounds for maintaining the standard value of the segment pointer or changing it in a specific manner.

If a segment pointer which has the value 0 as standard after the program-controlled unit has been switched on and reset is maintained unchanged for lack of corresponding instructions, then the program is executed which is stored in the memory segment 0 starting from the intrasegment address 0, that is to say in the first memory segment of the flash EPROM 22; if the segment pointer is set to the value 2 in response to external instigation, then the program is executed which is stored in the memory segment 2 starting from the intrasegment address 0, that is to say in the first memory segment of the external memory.

If the memory which can be addressed via the program-controlled unit were structured in such a way that the memory segments having the ordinal numbers 1 and 2 were realized by the flash EPROM 22 and the memory segments having the ordinal numbers 0 and 3 to $2^8-1$ were realized by the external memory, then—given otherwise unchanged conditions—after the starting up or resetting of the program-controlled unit, as standard, a program stored in the external memory would be executed and, in response to external instigation, a program stored in the second segment of the flash EPROM 22 would be executed.

It proves to be particularly favorable that a memory segment which is formed by a flash EPROM and contains a program to be executed after the starting up and/or resetting of the program-controlled unit is not the memory segment having the ordinal number 0. This is because the probability of this program being inadvertently erased and/or overwritten is then extremely low. The attempt, which frequently occurs in practice, to write interrupt vector tables or other data or programs at the start of the memory cannot, in any event, lead to the program to be executed after the starting up or resetting of the program-controlled unit being inadvertently erased and/or overwritten. This definitely applies when the flash EPROM 22, as in the present case, occupies two or more segments of the memory which can be addressed by the program-controlled unit, and when the program to be executed after the starting up or resetting of the program-controlled unit is stored not in the first segment of the flash EPROM but rather in the second segment, or one located even further behind, of the flash EPROM.

In the example considered, the program which is stored in the flash EPROM 22 and is to be executed after the starting up or resetting of the program-controlled unit is a bootstrap loader. Protecting the bootstrap loader from being inadvertently erased and/or overwritten is particularly important because without the bootstrap loader, it may occasionally be extremely difficult properly to activate and/or operate the system containing the program-controlled unit. This is the case particularly when the internal memory of the program-controlled unit no longer holds a program which is suitable for execution after the starting up or resetting of the program-controlled unit, and/or when—in a departure from the exemplary embodiment considered in the present case—no external memory is provided.

In the example considered in the present case, a program to be executed after the starting up or resetting of the program-controlled unit may be stored at two different locations. The limitation to two possible locations is advantageous insofar as any change that may have to be made to the segment pointer, can be carried out with minimal outlay; it suffices to switch over only a single bit of the segment pointer. Nevertheless, it is possible, however, for programs to be executed after the starting up or resetting of the program-controlled unit to be stored at more than two locations and to be executed by means of a change to the segment pointer which, although more complicated in that case, can nevertheless be carried out without any problems.

In the exemplary embodiment described, the intrasegment address after the starting up or resetting of the program-controlled unit in each case has the value 0. This proves to be favorable because the address from which the bootstrap loader or other programs to be executed after the starting up or resetting of the program-controlled unit are fetched in conventional program-controlled units is likewise the address 0, as standard. Equally, however, it is also possible to choose any other address different from 0. In the example considered, where the flash EPROM has, per memory segment, in each case a plurality of subsegments which can be erased and/or overwritten independently of one another, an expedient alternative consists, for example, in storing the program to be executed after the starting up or resetting of the program-controlled unit at the start of a second subsegment, or one located further behind, of a respective memory segment.

Irrespective of the details of the practical realisation, a program-controlled unit has been found in which the outlay for selecting and for executing a program to be executed after the starting up or resetting of the program-controlled unit, a program such as a bootstrap loader, for example, can be reduced to a minimum.

I claim:
1. A program-controlled system comprising:
   a memory storing a plurality of identifiable memory segments and a plurality of bootstrap loaders stored in said memory segments;

a program-controlled unit booting from at least one of said bootstrap loaders stored in said memory; and a segment pointer outside said program-controlled unit setting said boot memory segment to a memory segment of at least one of said plurality of bootstrap loaders to be loaded.

2. The program-controlled system according to claim 1, wherein said memory is external of said program-controlled unit.

3. The program-controlled system according to claim 1 which comprises an internal memory of the program-controlled unit, and wherein the memory segments are at least partially formed by said internal memory.

4. The program-controlled system according to claim 3, wherein said internal memory of the program-controlled unit defines memory segments having an ordinal number 2.

5. The program-controlled system according to claim 3, wherein said internal memory of the program-controlled unit defines memory segments having ordinal numbers 2 and higher.

6. The program-controlled system according to claim 3, wherein said internal memory of the program-controlled unit defines memory segments having ordinal numbers higher than 2.

7. The program-controlled system according to claim 3, wherein said internal memory of the program-controlled unit is a flash EPROM.

8. The program-controlled system according to claim 3, wherein a bootstrap loader to be executed during the boot-up of the program-controlled unit is stored in said internal memory.

9. The program-controlled system according to claim 8, wherein the bootstrap loader is stored in a second memory segment of said internal memory.

10. The program-controlled system according to claim 8, wherein the bootstrap loader is stored in a memory segment of said internal memory having an ordinal number 2 or greater.

11. The program-controlled system according to claim 1, wherein the program-controlled unit is programmed to change a content of the segment pointer on boot-up such that a changed segment pointer selects the memory segment in which the bootstrap loader is stored.

12. The program-controlled system according to claim 11, wherein the segment pointer of the memory segment in which the bootstrap loader is stored differs from the segment pointer of the memory segment that is selected by standard on first boot-up of the program-controlled unit in as few bits as possible.

13. The program-controlled system according to claim 11, wherein the program-controlled unit is programmed to change the content of the segment pointer in response to input from a source external to the program-controlled unit.

14. The program-controlled system according to claim 1, wherein the program-controlled unit is selected from the group consisting of a microprocessor, a microcontroller, and a signal processor.

15. The program-controlled system according to claim 1, wherein said segment pointer is software controlled.

16. A method of operating a program-controlled unit, which comprises:

storing a plurality of bootstrap loaders in a plurality of memory segments of an available memory;

booting from at least one of the memory segments from the available memory by setting a segment pointer; and selectively setting a content of the segment pointer prior to executing a bootstrap loading operation with the program-controlled unit.

* * * * *